(12) United States Patent
Heckmeier et al.

(10) Patent No.: US 6,749,907 B2
(45) Date of Patent: Jun. 15, 2004

(54) ELECTRO-OPTICAL LIQUID-CRYSTAL DISPLAY

(75) Inventors: Michael Heckmeier, Bensheim (DE); Marcus Reuter, Darmstadt (DE); Matthias Bremer, Darmstadt (DE); Eike Poetsch, Muhltal (DE)

(73) Assignee: Merck Patent Gesellschaft Mit Beschränkter Haftung, Darmstadt (DE)

( * ) Notice: Subject to any disclaimer, the term of this patent is extended or adjusted under 35 U.S.C. 154(b) by 0 days.

(21) Appl. No.: 09/819,799

(22) Filed: Mar. 29, 2001

(65) Prior Publication Data

US 2002/0043645 A1 Apr. 18, 2002

(30) Foreign Application Priority Data

Apr. 7, 2000 (DE) .......................... 100 17 384

(51) Int. Cl.$^7$ .................. C09K 19/34; C09K 19/30; C09K 19/12; C09K 19/20
(52) U.S. Cl. .............. 428/1.1; 252/299.61; 252/299.63; 252/299.66; 252/299.67
(58) Field of Search ...................... 428/1.1; 252/295.61, 252/295.63, 299.66, 299.67

(56) References Cited

U.S. PATENT DOCUMENTS

| | | | | |
|---|---|---|---|---|
| 5,397,505 A | * | 3/1995 | Rieger et al. .......... | 252/299.67 |
| 5,733,477 A | * | 3/1998 | Kondo et al. .......... | 252/299.67 |
| 5,820,784 A | * | 10/1998 | Kondo et al. .......... | 252/299.63 |
| 6,051,288 A | * | 4/2000 | Kondo et al. ................. | 428/1.1 |
| 6,190,576 B1 | * | 2/2001 | Andou et al. .......... | 252/299.63 |
| 6,331,064 B1 | * | 12/2001 | Nishiyama et al. ......... | 362/260 |
| 6,582,782 B2 | * | 6/2003 | Heckmeier et al. .......... | 428/1.1 |

FOREIGN PATENT DOCUMENTS

WO   WO96/32365   * 10/1996

* cited by examiner

Primary Examiner—Shean C Wu
(74) Attorney, Agent, or Firm—Millen, White, Zelano & Branigan, P.C.

(57) ABSTRACT

An electro-optical liquid-crystal display having a realignment layer for realigning the liquid crystals whose field has a component, which is crucial for the realignment, parallel to the liquid-crystal layer, containing a liquid-crystalline medium of positive dielectric anisotropy, where the medium comprises at least one mesogenic compound and at least one compound of the formula I

I

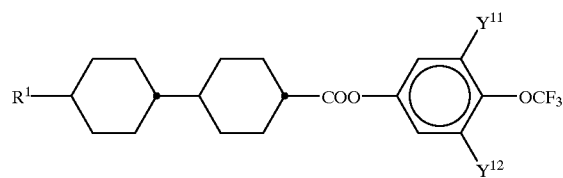

in which the substituents are as defined herein.

24 Claims, No Drawings

ELECTRO-OPTICAL LIQUID-CRYSTAL DISPLAY

The invention relates to an electro-optical liquid-crystal display having a realignment layer for realignment of the liquid crystals whose field has a component, which is crucial for the realignment, parallel to the liquid-crystal layer, containing a liquid-crystalline medium of positive dielectric anisotropy, where the medium comprises at least one mesogenic compound of the formula I

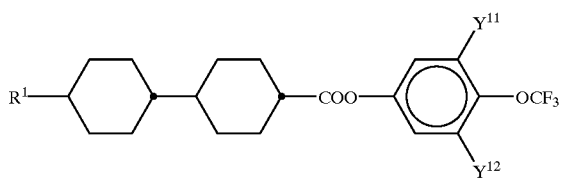

in which
R$^1$ is alkyl or alkoxy having 1 to 7 carbon atoms or alkenyl, alkenyloxy or alkoxyalkyl having 2 to 7 carbon atoms, and
Y$^{11}$ and Y$^{12}$ are each, independently of one another, H or F.

In conventional liquid-crystal displays (TN, STN, OMI or AMD-TN), the electric fields for realignment are generated essentially perpendicular to the liquid-crystal layer.

International Patent Application WO 91/10936 discloses a liquid-crystal display in which the electric signals are generated in such a way that the electric fields have a significant component parallel to the liquid-crystal layer (IPS, in-plane switching). The principles of operating a display of this type are described, for example, by R. A. Soref in Journal of Applied Physics, Vol.45, No. 12, pp. 5466–5468 (1974).

EP 0 588 568, for example, discloses various possibilities for the design of the electrodes and for addressing a display of this type. DE 198 24 137 likewise describes various embodiments of IPS displays of this type.

Liquid-crystalline materials for IPS displays of this type are described, for example, in DE 198 48 181.

The IPS displays containing the known liquid-crystalline media are characterized by inadequate, long response times and often excessively high operating voltages. There is thus a demand for IPS displays which do not have these disadvantages or only do so to a reduced extent. To this end, in particular liquid-crystalline materials are required which, besides an adequate phase range, low tendency towards crystallization at low temperatures, low birefringence and adequate electrical resistance, have, in particular, low threshold voltages (V$_{10}$) and low rotational viscosities (γ$_1$), which are crucial for the response times.

This object has, surprisingly, been achieved by the use of liquid-crystalline materials which comprise at least one compound of the formula I.

Upon further study of the specification and appended claims, further objects and advantages of this invention will become apparent to those skilled in the art.

The IPS mixtures according to the invention are distinguished by their relatively high clearing points and their low rotational viscosity values and their low threshold values.

The invention thus relates to an electro-optical liquid-crystal display having a realignment layer for realignment of the liquid crystals whose field has a significant component parallel to the liquid-crystal layer, containing a liquid-crystalline medium of positive dielectric anisotropy, where the medium comprises at least one compound of the formula I

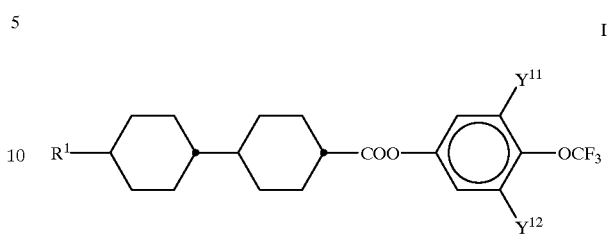

in which

R$^1$ is alkyl or alkoxy having 1 to 7 carbon atoms or alkenyl, alkenyloxy or alkoxyalkyl having 2 to 7 carbon atoms, and Y$^{11}$ and Y$^{12}$ are each, independently of one another, H or F.

Particular preference is given to compounds of the formula I in which at least one of the radicals Y$^{12}$ and Y$^{11}$ is F. Very particular preference is given to compounds of the formula I in which one of the radicals Y$^{11}$ and Y$^{12}$ is H and the other is F.

Preference is furthermore given to liquid-crystal displays containing liquid-crystalline media which further comprise one or more compounds of the formula II

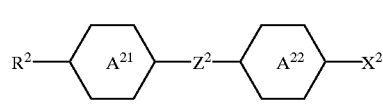

in which

R$^2$ is alkyl or alkoxy having 1 to 7 carbon atoms or alkenyl, alkenyloxy or alkoxyalkyl having 2 to 7 carbon atoms, A$^{21}$ and A$^{22}$ are each, independently of one another,

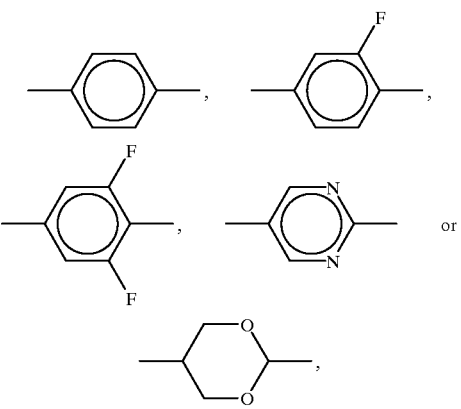

at least one of $A^{21}$ and $A^{22}$ is

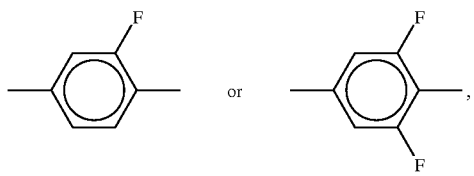

$X^2$ is F, Cl or CN, and
$Z^2$ is $CH_2CH_2$, COO, $CF_2O$ or a single bond.

Particular preference is given to compounds of the formula II in which

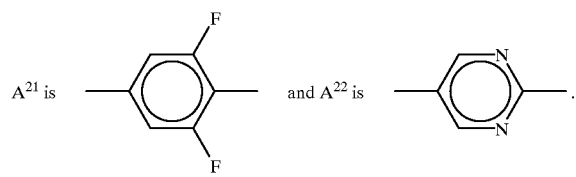

Preference is furthermore given to compounds of the formula II in which

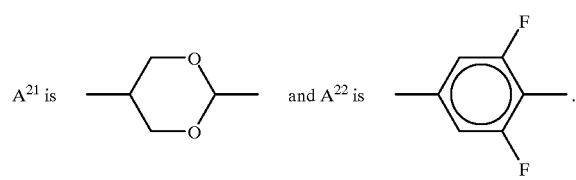

Preference is furthermore given to compounds of the formula II in which $X^2$ is CN.

Preference is furthermore given to liquid-crystal displays in which the liquid-crystalline medium further comprises one or more compounds of the formula III $$R^{31}-A^{31}-Z^{31}-A^{32}-R^{32}$$ III in which
$R^{31}$ and $R^{32}$ are each, independently of one another, alkyl or alkoxy having 1 to 7 carbon atoms or alkenyl, alkenyloxy or alkoxyalkyl having 2 to 7 carbon atoms,

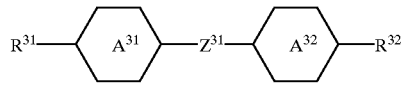

are each, independently of one another,

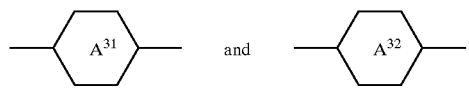

and
$Z^{31}$ is CH=CH, COO, $CH_2CH_2$ or a single bond.

Particular preference is given to compounds of the formula III in which at least one of the radicals $R^{31}$ and $R^{32}$ is alkenyl having 2 to 7 carbon atoms, preferably having 2 or 3 carbon atoms.

Preference is furthermore given to compounds of the formula III in which $Z^{31}$ is CH=CH or a single bond.

Preference is furthermore given to compounds of the formula III in which at least one of

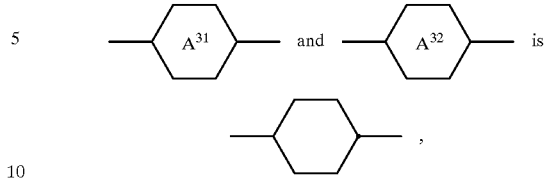

particularly preferably both are

Preference is furthermore given to liquid-crystal displays in which the liquid-crystalline medium further comprises one or more compounds of the formula IV

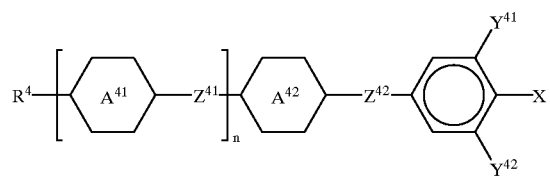

IV in which
$R^4$ is alkyl or alkoxy having 1 to 7 carbon atoms or alkenyl, alkenyloxy or alkoxyalkyl having 2 to 7 carbon atoms,

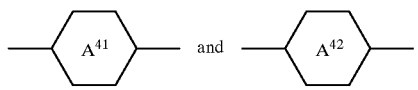

are each, independently of one another,

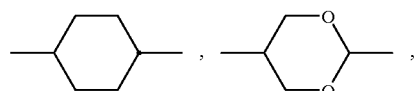

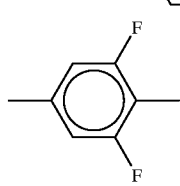

$Z^{41}$ and $Z^{42}$ are each, independently of one another, $CF_2O$, COO, $CH_2CH_2$ or a single bond,
n is 0 or 1,
X is $OCF_3$, $OCF_2H$ or F,
and
$Y^{41}$ and $Y^{42}$ are each, independently of one another, H or F.

Particular preference is given to compounds of the formula IV in which at least one of

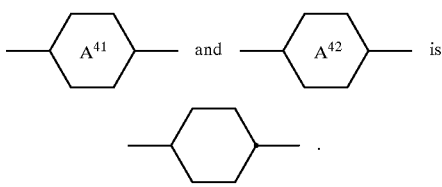

is

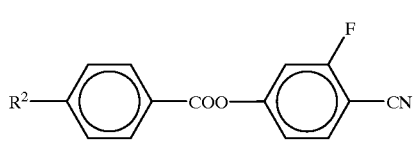

Preference is furthermore given to compounds of the formula IV in which $Z^{41}$ and $Z^{42}$ are each, independently of one another, $CH_2CH_2$ or a single bond.

Preference is furthermore given to compounds of the formula IV in which X is $OCF_3$, and $Y^{41}$ and $Y^{42}$ are H, and to compounds of the formula IV in which X is F, and $Y^{41}$ and $Y^{42}$ are F.

Particular preference is given to media which comprise at least one compound of the formula I and at least one compound of the formula II.

Particular preference is given to liquid-crystal displays in which the liquid-crystalline medium comprises one or more compounds of the formula II selected from the group consisting of the formulae IIa to Iii:

IIa
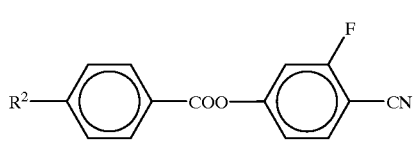

IIb
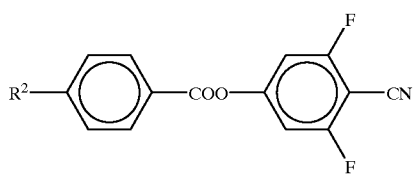

IIc
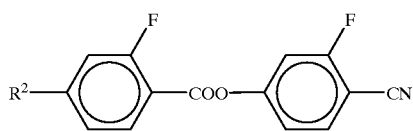

IId
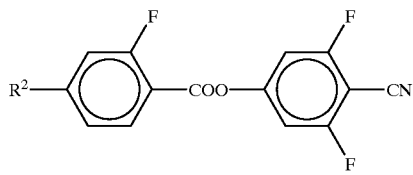

IIe
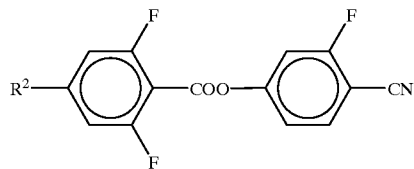

IIf
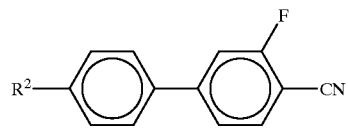

IIg
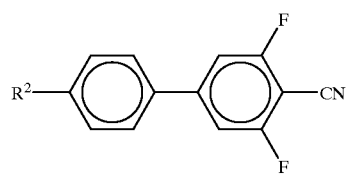

IIh
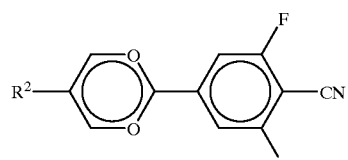

IIi
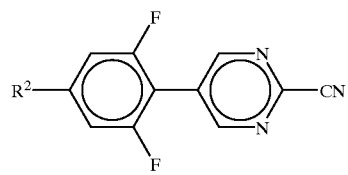

in which $R^2$ is as defined in the formula II.

The liquid-crystal display particularly preferably contains a liquid-crystalline medium comprising one or more compounds selected from the group consisting of the compounds of the formulae IIa, IIf, IIg, IIh and IIi, in particular IIh and IIi.

Preference is furthermore given to liquid-crystal displays in which the liquid-crystalline medium comprises one or more compounds of the formula III selected from the group consisting of the formulae IIIa to IIIc:

IIIa
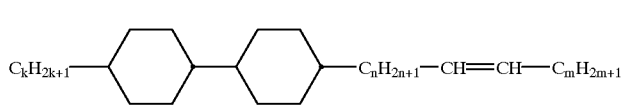

IIIb
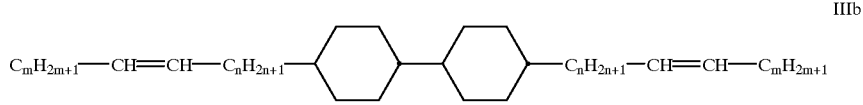

IIIc

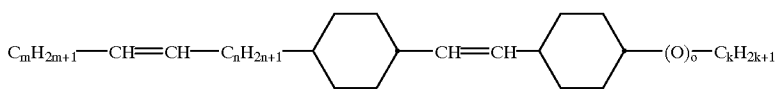

in which k is 1, 2, 3, 4 or 5, m and n are each, independently of one another, 0, 1, 2 or 3, and m+n ≦5, and o is 0 or 1.

Preference is furthermore given to liquid-crystal displays in which the liquid-crystalline medium comprises one or more compounds of the formula IV selected from the group consisting of the formulae IVa to IV:

IVa

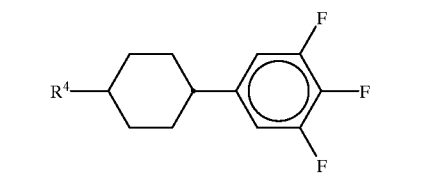

IVb

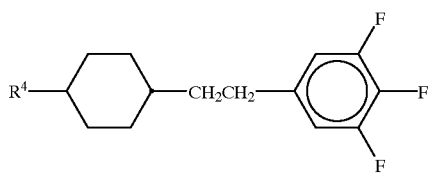

IVc

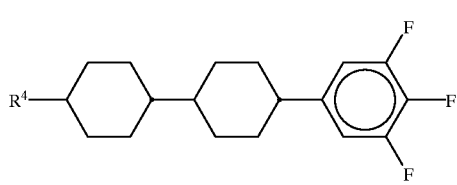

IVd

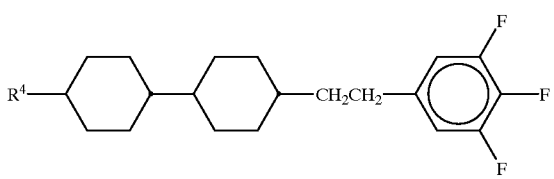

IVe

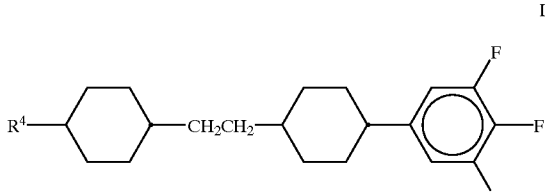

IVf

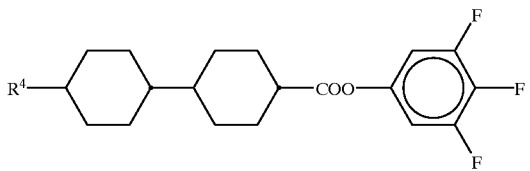

IVg

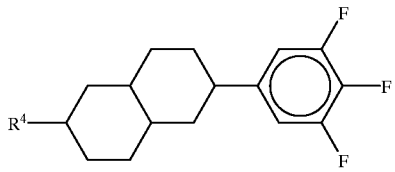

IVh

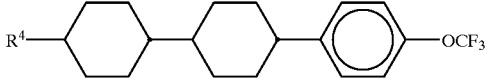

IVi

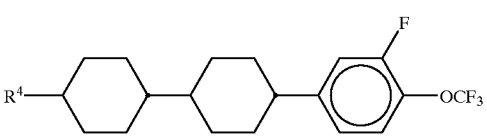

IVk

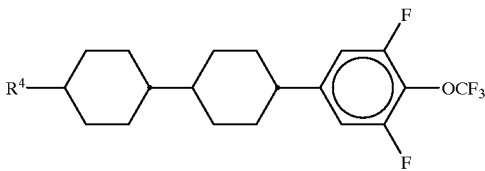

IVm

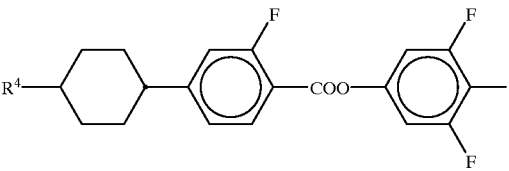

IVn

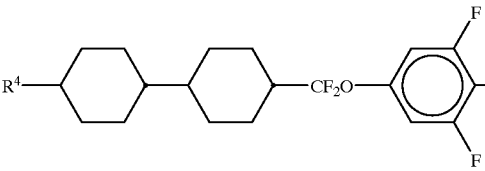

in which $R^4$ is as defined in the formula IV.

In a further preferred embodiment, the liquid-crystal display cells contain liquid-crystalline media which comprise one or more compounds of the formula IIh, where the concentration of each individual one of these compounds is in the range from 0.1 to 20%, preferably from 1 to 16%, particularly preferably from 2 to 15% and very particularly preferably from 12 to 15%.

In a preferred embodiment of the invention, the liquid-crystal display cells contain liquid-crystalline media which comprise one or more compounds of the formula IIi, where the concentration of each individual one of these compounds is from 0.1 to 10%, preferably from 1 to 7% and particularly preferably from 1 to 5%.

Preferred embodiments are the following liquid-crystal displays:

the medium additionally comprises one or more compounds selected from the group consisting of the formulae Va and Vb

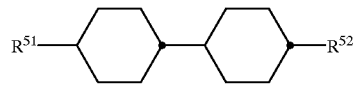

Va

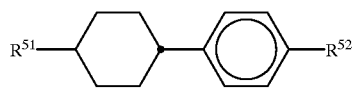

Vb in which $R^{51}$ and $R^{52}$ are each, independently of one another, alkyl or alkoxy having 1 to 7 carbon atoms or alkenyl, alkenyloxy or alkoxyalkyl having 2 to 7 carbon atoms, $R^{51}$ is preferably alkyl having 1 to 5 carbon atoms, $R^{52}$ is preferably alkyl or alkoxy, in particular alkoxy, having 1 to 3 carbon atoms, and/or one or more compounds selected from the group consisting of the formulae Vc and Vd

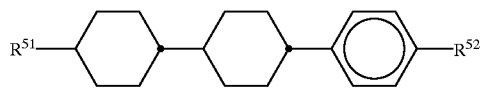

Vc

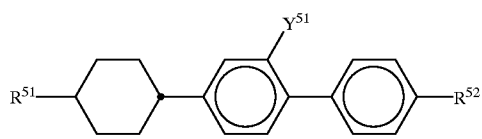

Vd in which $R^{51}$ and $R^{52}$, independently of one another, are as defined above, $R^{51}$ preferably being n-alkyl having 3 to 5 carbon atoms and $R^{52}$ preferably being n-alkyl, and $Y^{51}$ is H or F;

the medium additionally comprises one or more compounds of the formula VIa

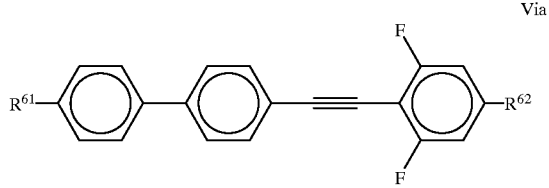

VIa in which $R^{61}$ and $R^{62}$ are each, independently of one another, alkyl or alkoxy having 1 to 7 carbon atoms, preferably alkyl having 1 to 5 carbon atoms;

the medium additionally comprises one or more compounds of the formula VII

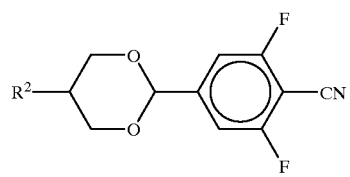

VII in which $R^2$ is as defined in the formula II.

Preference is given to displays containing liquid-crystal mixtures comprising one or more compounds of the formula Va in which preferably at least one of the groups $R^{51}$ and $R^{52}$ is alkenyl, preferably 1E-alkenyl, particularly preferably vinyl or 1E-propyl, one or more compounds of the formula Vb in which preferably $R^{51}$ is n-alkyl having 3 to 5 carbon atoms, particularly preferably having 3 to 5 carbon atoms, and $R^{52}$ is alkoxy having 1 to 3 carbon atoms, particularly preferably having 1 carbon atom, one or more compounds of the formula Vc in which
$R^{51}$ is n-alkyl having 1 to 5 carbon atoms, preferably having 1 to 3 carbon atoms, and
$R^{52}$ is 1E-alkenyl having 2 to 5 carbon atoms, preferably having 2 to 3 carbon atoms, one or more compounds of the formula Vd in which
$R^{51}$ is n-alkyl having 1 to 5 carbon atoms, preferably having 3 to 5 carbon atoms,
$R^{52}$ is n-alkyl having 1 to 5 carbon atoms, preferably having 2 to 4 carbon atoms, and
$Y^{51}$ is preferably H.

Preference is furthermore given to a liquid-crystal display according to the invention in which the pixels are addressed by means of an active matrix.

The invention furthermore relates to a liquid-crystalline medium of positive dielectric anisotropy which comprises at least one compound of the formula I and at least one compound selected from the group consisting of the compounds of the formulae IIa to IIIb, and at least one compound selected from the group consisting of the compounds of the formulae IVa to IVi, in particular which comprises from 4 to 55, preferably from 10 to 40% by weight of at least one compound of the formula I, from 5 to 50, preferably from 10 to 25% by weight of at least one compound selected from the group consisting of the compounds of the formulae II and III, preferably of the formulae IIa to IIIc, from 0 to 40, preferably from 3 to 25% by weight of at least compound of the formula II, from 0 to 30, preferably from 3 to 25% by weight of at least one compound of the formula III, and from 5 to 60, preferably from 20 to 50% by weight of at least one compound of the formula IV, preferably selected from the group consisting of the compounds of the formulae IVa to IVk.

The liquid-crystalline media used in accordance with the invention generally have a birefringence ($\Delta n$) of <0.12, preferably in the range from 0.05 to 0.11, in particular in the range from 0.07 to 0.10, with clearing points of from 70 to 90° C.

The flow viscosity (at 20° C.) of the mixtures used in accordance with the invention is generally less than 30 mm$^2$·s$^{-1}$, in particular between 15 and 25 mm$^2$·s$^{-1}$. The resistivity of the materials according to the invention is generally, at 20° C., from $5\times10^{10}$ to $5\times10^{13}\Omega\cdot$cm, particularly preferably from $5\times10^{11}$ to $5\times10^{12}\Omega\cdot$cm. The rotational viscosity of the mixtures according to the invention is generally, at 20° C., less than 140 mPa·s, in particular $\leq$130 mPa·s, particularly preferably $\leq$120 mPa·s.

Media having clearing points of from 70 to 80° C. which are used in accordance with the invention have rotational viscosities of 130 mPa·s or less, preferably from 80 to 120 mPa·s.

The clearing point of the media used in accordance with the invention is greater than 60° C., preferably greater than 70° C. and particularly preferably 80° C. or greater. In particular, the clearing point is in the range from 60° C. to 80° C. The shelf life in test cells, determined as described below, is 1000 hours or more at −30° C., preferably 500 hours or more at −40° C. and very particularly preferably 1000 hours or more at −40° C.

The media used in accordance with the invention consist of from 5 to 30 compounds, preferably of from 6 to 20 compounds and particularly preferably of from 7 to 16 compounds.

It has been found that even a relatively low proportion of compounds of the formula I in a mixture with conventional liquid-crystal materials, but in particular with one or more compounds selected from the group consisting of the compounds of the formulae IIa to IIi and/or from the group consisting of the compounds of the formulae IIIa to IVf, results in a significant lowering of the threshold voltage, in favourable rotational viscosity values $\gamma_1$ and in fast response times, with, in particular, broad nematic phases with low smectic-nematic transition temperatures being observed. The compounds of the formulae I to IV are colorless, stable and readily miscible with one another and with other liquid-crystal materials.

The term "alkyl" covers straight-chain and branched alkyl groups having 1–7 carbon atoms, in particular the straight-chain groups methyl, ethyl, propyl, butyl, pentyl, hexyl and heptyl. Groups having 2–5 carbon atoms are preferred, unless explicitly stated otherwise.

The term "alkenyl" covers straight-chain and branched alkenyl groups having 2–7 carbon atoms, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of very particularly preferred alkenyl groups are vinyl, 1E-propenyl, 1E-butenyl, 1E-pentenyl, 1E-hexenyl, 1E-heptenyl, 3E-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are preferred, unless explicitly stated otherwise.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "alkoxyalkyl" preferably covers straight-chain radicals of the formula $C_nH_{2n+1}$—O—$(CH_2)_m$, in which n and m are each, independently of one another, from 1 to 6. Preferably, m=1 and n is from 1 to 4.

Through a suitable choice of the meanings of $R^1$ to $R^{52}$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl and alkoxy radicals. 4-alkenyl radicals, 3-alkenyl radicals and the like generally give lower threshold voltages and smaller values of $k_{33}/k$ compared with alkyl and alkoxy radicals.

The optimum mixing ratio of the compounds of the formulae I–IV depends substantially on the desired properties, on the choice of the components of the formulae I, II, III and/or IV, and on the choice of any further components present. Suitable mixing ratios within the range indicated above can easily be determined from case to case.

The total amount of compounds of the formulae I to IV in the mixtures according to the invention is not crucial. The mixtures preferably consist of 50–90% by weight of compounds of the formulae I to IV. The mixtures may also comprise one or more further components in order to optimize various properties. However, the observed effect, particularly on the low-temperature stability, is generally greater the higher the total concentration of compounds of the formulae I to IV, in particular of the formula I.

In a particularly preferred embodiment, the media according to the invention comprise compounds of the formula IV in which X is $OCF_3$. A favourable synergistic effect with the compounds of the formulae I and II results in particularly advantageous properties.

The liquid-crystalline media according to the invention preferably comprise from 2 to 40, in particular from 4 to 30, compounds as further constituents besides one or more compounds of the formula I. These media very particularly preferably comprise from 7 to 25 compounds besides one or more compounds of the formula I. These further constituents are preferably selected from nematic or nematogenic (monotropic or isotropic) substances, in particular substances from the classes of the azoxybenzenes, benzylideneanilines, biphenyls, terphenyls, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid or of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)ethanes, 1-cyclohexyl-2-biphenylylethanes, 1-phenyl-2-cyclohexylphenylethanes, optionally halogenated stilbenes, benzyl phenyl ethers, tolans and substituted cinnamic acids. The 1,4-phenylene groups in these compounds may also be fluorinated.

The most important compounds suitable as further constituents of media according to the invention can be characterized by the formulae 1, 2, 3, 4 and 5:

| | |
|---|---|
| R'—L—E—R" | 1 |
| R'—L—COO—E—R" | 2 |
| R'—L—OOC—E—R" | 3 |
| R'—L—CH$_2$CH$_2$—E—R" | 4 |
| R'—L—C≡C—E—R" | 5 |

In the formulae 1, 2, 3, 4 and 5, L and E, which may be identical or different, are each, independently of one another, a bivalent radical from the group formed by -Phe-, -Cyc-, -Phe-Phe-, -Phe-Cyc-, -Cyc-Cyc-, -Pyr-, -Dio-, -G-Phe- and -G-Cyc- and their mirror images, where Phe is unsubstituted or fluorine-substituted 1,4-phenylene, Cyc is trans-1,4-cyclohexylene or 1,4-cyclohexylene, Pyr is pyrimidine-2,5-diyl or pyridine-2,5-diyl, Dio is 1,3-dioxane-2,5-diyl, and G is 2-(trans-1,4-cyclohexyl)ethyl, pyrimidine-2,5-diyl, pyridine-2,5-diyl or 1,3-dioxane-2,5-diyl.

One of the radicals L and E is preferably Cyc, Phe or Pyr. E is preferably Cyc, Phe or Phe-Cyc. The media according to the invention preferably comprise one or more components selected from the compounds of the formulae 1, 2, 3, 4 and 5 in which L and E are selected from the group consisting of Cyc, Phe and Pyr and simultaneously one or more components selected from the compounds of the formulae 1, 2, 3, 4 and 5 in which one of the radicals L and E is selected from the group consisting of Cyc, Phe and Pyr and the other radical is selected from the group consisting of -Phe-Phe-, -Phe-Cyc-, -Cyc-Cyc-, -G-Phe- and -G-Cyc-, and optionally one or more components selected from the compounds of the formulae 1, 2, 3, 4 and 5 in which the radicals L and E are selected from the group consisting of -Phe-Cyc-, -Cyc-Cyc-, -G-Phe- and -G-Cyc-.

In a smaller sub-group of the compounds of the formulae 1, 2, 3, 4 and 5, R' and R'' are each, independently of one another, alkyl, alkenyl, alkoxy, alkoxyalkyl, alkenyloxy or alkanoyloxy having up to 8 carbon atoms. This smaller sub-group is called Group A below, and the compounds are referred to by the sub-formulae 1a, 2a, 3a, 4a and 5a. In most of these compounds, R' and R'' are different from one another, one of these radicals usually being alkyl, alkenyl, alkoxy or alkoxyalkyl.

In another smaller sub-group of the compounds of the formulae 1, 2, 3, 4 and 5, which is known as Group B, R'' is —F, —Cl, —NCS or —(O)$_i$CH$_{3-(k+l)}$F$_k$Cl$_l$, where i is 0 or 1, and k+l is 1, 2 or 3; the compounds in which R'' has this meaning are referred to by the sub-formulae 1b, 2b, 3b, 4b and 5b. Particular preference is given to those compounds of the sub-formulae 1b, 2b, 3b, 4b and 5b in which R'' is —F, —Cl, —NCS, —CF$_3$, —OCHF$_2$ or —OCF$_3$.

In the compounds of the sub-formulae 1b, 2b, 3b, 4b and 5b, R' is as defined for the compounds of the sub-formulae 1a–5a and is preferably alkyl, alkenyl, alkoxy or alkoxyalkyl.

In a further smaller sub-group of the compounds of the formulae 1, 2, 3, 4 and 5, R'' is —CN; this sub-group is referred to below as Group C, and the compounds of this sub-group are correspondingly described by sub-formulae 1c, 2c, 3c, 4c and 5c. In the compounds of the sub-formulae 1c, 2c, 3c, 4c and 5c, R' is as defined for the compounds of the sub-formulae 1a–5a and is preferably alkyl, alkoxy or alkenyl.

Besides the preferred compounds of groups A, B and C, other compounds of the formulae 1, 2, 3, 4 and 5 having other variants of the proposed substituents are also customary. All these substances are obtainable by methods which are known from the literature or analogously thereto.

Besides the compounds of the formula I to IV, the media according to the invention preferably comprise one or more compounds selected from Group A and/or Group B and/or Group C. The proportions by weight of the compounds from these groups in the media according to the invention are preferably Group A: from 0 to 90%, preferably from 20 to 90%, in particular from 30 to 90%

Group B: from 0 to 80%, preferably from 10 to 80%, in particular from 10 to 65%

Group C: from 0 to 80%, preferably from 5 to 80%, in particular from 5 to 50%, the sum of the proportions by weight of the Group A and/or B and/or C compounds present in the respective media according to the invention preferably being from 5% to 90% and in particular from 10% to 90%.

The media according to the invention preferably comprise from 1 to 40%, particularly preferably from 5 to 30% of compounds of the formula I. The media preferably comprise two or more compounds of the formula I.

The structure of the IPS display according to the invention corresponds to the usual design for displays of this type, as described, for example, in WO 91/10936 or EP 0 588 568. The term usual design is broadly drawn here and also covers all derivatives and modifications of the IPS display, in particular, for example, also matrix display elements based on poly-Si TFT or MIM.

However, an essential difference of the displays according to the invention from those usual hitherto consists in the choice of the liquid-crystal parameters of the liquid-crystal layer.

The liquid-crystal mixtures which can be used in accordance with the invention are prepared in a manner conventional per se. In general, the desired amount of the components used in smaller amount is dissolved in the components making up the principal constituent, advantageously at elevated temperature. It is also possible to prepare the mixtures in other conventional manners, for example by use of premixtures, for example homologue mixtures, or using so-called "multibottle" systems.

The dielectrics may also comprise further additives known to the person skilled in the art and described in the literature. For example, 0–15%, preferably 0–10%, of pleochroic dyes and/or chiral dopants may be added. The individual compounds added are employed in concentrations of from 0.01 to 6% and preferably from 0.1 to 3%. However, the concentrations given here for the other constituents of the liquid-crystal mixtures, i.e. the liquid-crystalline or mesogenic compounds, are indicated without taking into account the concentration of these additives.

Above and below,

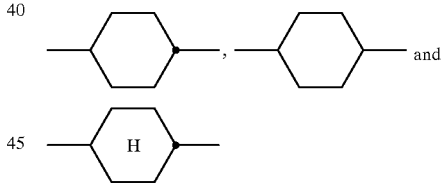

denote trans 1,4-cyclohexylene.

The physical properties of the liquid-crystal mixtures are determined in accordance with "Physical Properties of Liquid Crystals" Ed. M. Becker, Merck KGaA, as of November 1997, unless explicitly stated otherwise.

C denotes a crystalline phase, S a smectic phase, S$_C$ a smectic C phase, S$_A$ a smectic A phase, N a nematic phase and I the isotropic phase. V$_0$ denotes the capacitive threshold voltage. Δn denotes the optical anisotropy, and n$_0$ the ordinary refractive index (in each case at 589 nm). Δε denotes the dielectric anisotropy (Δε=ε$_∥$-ε$_⊥$, where ε$_∥$ denotes the dielectric constant parallel to the longitudinal molecular axes and ε$_⊥$ denotes the dielectric constant perpendicular thereto, in each case at 1 kHz). The electro-optical data were measured in a planar cell at 20° C., unless expressly stated otherwise. All physical properties are indicated and measured at 20° C., unless expressly stated otherwise.

The cells are preferably bright in the "off" state.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited above and of corresponding German Application No. 10017384.5, filed Apr. 7, 2000 is hereby incorporated by reference.

EXAMPLES

The examples below are intended to illustrate the invention without representing a limitation. Above and below, percentages are per cent by weight. All temperatures are indicated in degrees Celsius. $\Delta$n denotes optical anisotropy (589 nm, 20° C.), $\Delta\epsilon$ denotes the dielectric anisotropy (1 kHz, 20° C.), H.R. denotes the voltage holding ratio (at 100° C., after 5 minutes in an oven at 1 V), and $V_0$, the capacitive threshold voltage, was determined at 20° C. and 1 kHz.

The calibrated rotational viscometer gave a rotational viscosity for ZLI-4792 (Merck KGaA) of 133 mPa·s at 20° C.

The shelf life was investigated in sealed test cells with an optical retardation of about 0.5 µm with CU-1511 from DuPont, USA, as alignment layer. To this end, in each case five test cells were bonded on both sides to crossed polarizers and stored at fixed temperatures of 0° C., –10° C., –20° C., –30° C. and –40° C. At intervals of 24 hours in each case, the cells were assessed visually for changes. The storage time noted at the respective temperature $t_{store}$ (T) was the final time at which a change was just not observed in any cell.

In the present application and in the examples below, the structures of the liquid-crystal compounds are indicated by means of acronyms, the transformation into chemical formulae taking place in accordance with Tables A and B below. All radicals $C_nH_{2n+1}$ are straight-chain alkyl radicals having n carbon atoms. The coding in Table B is self-evident. In Table A, only the acronym for the parent structure is indicated, followed in individual cases, separated from the acronym for the parent structure by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| Nm | $C_nH_{2n+1}$ | $C_mH_{2m+1}$ | H | H |
| NOm | $C_nH_{2n+1}$ | $C_mH_{2m+1}$ | H | H |
| nO.m | $OC_nH_{2n+1}$ | $C_mH_{2m+1}$ | H | H |
| N | $C_nH_{2n+1}$ | CN | H | H |
| nN.F | $C_nH_{2n+1}$ | CN | F | H |
| nN.F.F | $C_nH_{2n+1}$ | CN | F | F |
| NF | $C_nH_{2n+1}$ | F | H | H |
| NOF | $OC_nH_{2n+1}$ | F | H | H |
| NCl | $C_nH_{2n+1}$ | Cl | H | H |
| nF.F | $C_nH_{2n+1}$ | F | F | H |
| nCF$_3$ | $C_nH_{2n+1}$ | CF$_3$ | H | H |
| NOCF$_3$ | $C_nH_{2n+1}$ | OCF$_3$ | H | H |
| NOCF$_3$ | $C_nH_{2n+1}$ | OCF$_3$ | H | H |
| NOCF$_2$ | $C_nH_{2n+1}$ | OCHF$_2$ | H | H |
| NS | $C_nH_{2n+1}$ | NCS | H | H |
| RVsN | $C_rH_{2r+1}$—CH=CH—$C_sH_{2s}$— | CN | H | H |
| REsN | $C_rH_{2r+1}$—O—$C_sH_{2s}$— | CN | H | H |
| NAm | $C_nH_{2n+1}$ | C≡C—$C_mH_{2m+1}$ | H | H |

-continued

| Code for $R^1$, $R^2$, $L^1$, $L^2$ | $R^1$ | $R^2$ | $L^1$ | $L^2$ |
|---|---|---|---|---|
| nF.F.F | $C_nH_{2n+1}$ | F | F | F |
| nCl.F.F | $C_nH_{2n+1}$ | Cl | F | F |
| nCF$_3$.F.F | $C_nH_{2n+1}$ | CF$_3$ | F | F |
| NOCF$_3$.F.F | $C_nH_{2n+1}$ | OCF$_3$ | F | F |
| NOCF$_2$.F.F | $C_nH_{2n+1}$ | OCHF$_2$ | F | F |
| NOCF$_3$.F | $C_nH_{2n+1}$ | OCF$_3$ | F | H |

Preferred displays contain media comprising, in particular, one or more compounds from Tables A and B in addition to the compounds of the formula I.

Particularly preferred IPS displays contain media comprising one or more compounds of one of the formulae from Table A and one or more compounds of the formulae from Table B in each case one or more compounds of two or more different types of compounds of the formulae from Table A in each case one or more compounds of two or more different types of compounds of the formulae from Table B in each case one or more compounds of four or more compound s from the group consisting of the compounds of the formulae from Tables A and B.

TABLE A

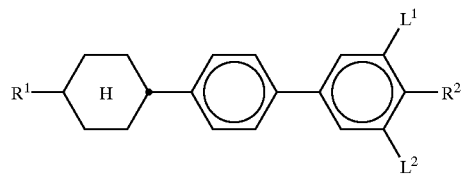

BCH

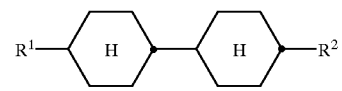

CCH

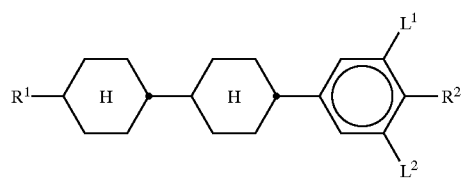

CCP

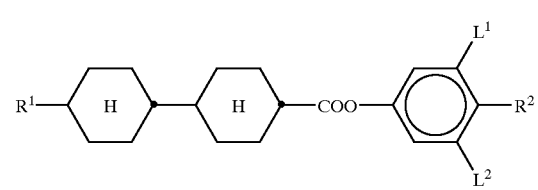

CP

TABLE A-continued
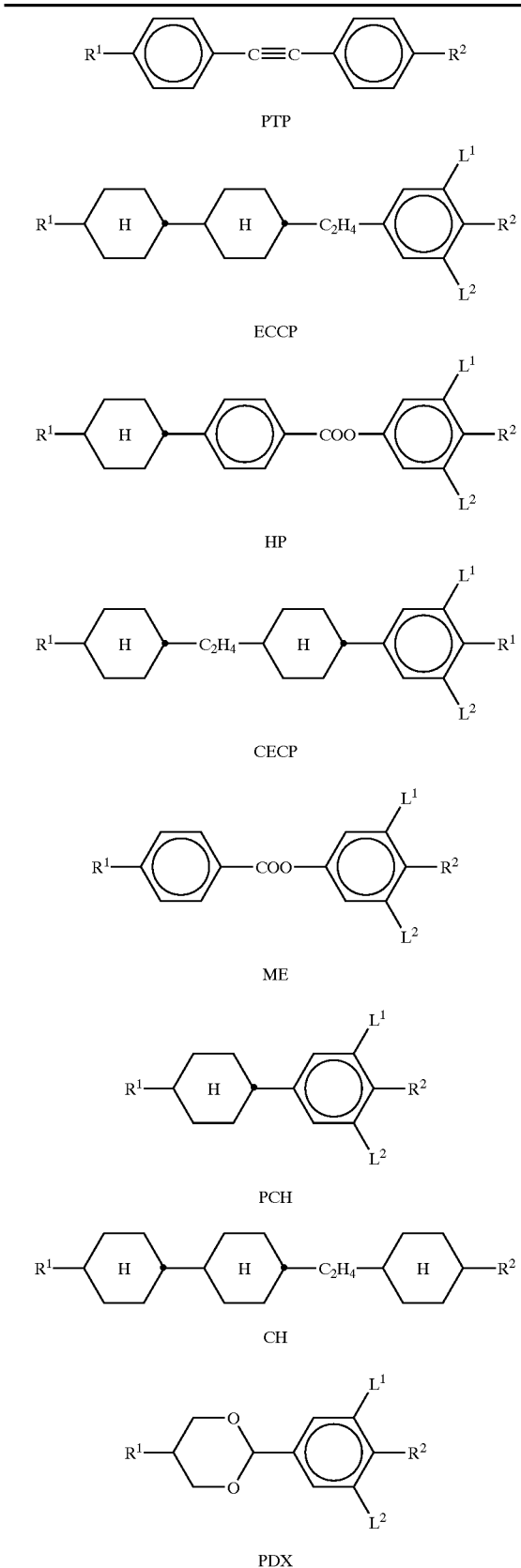
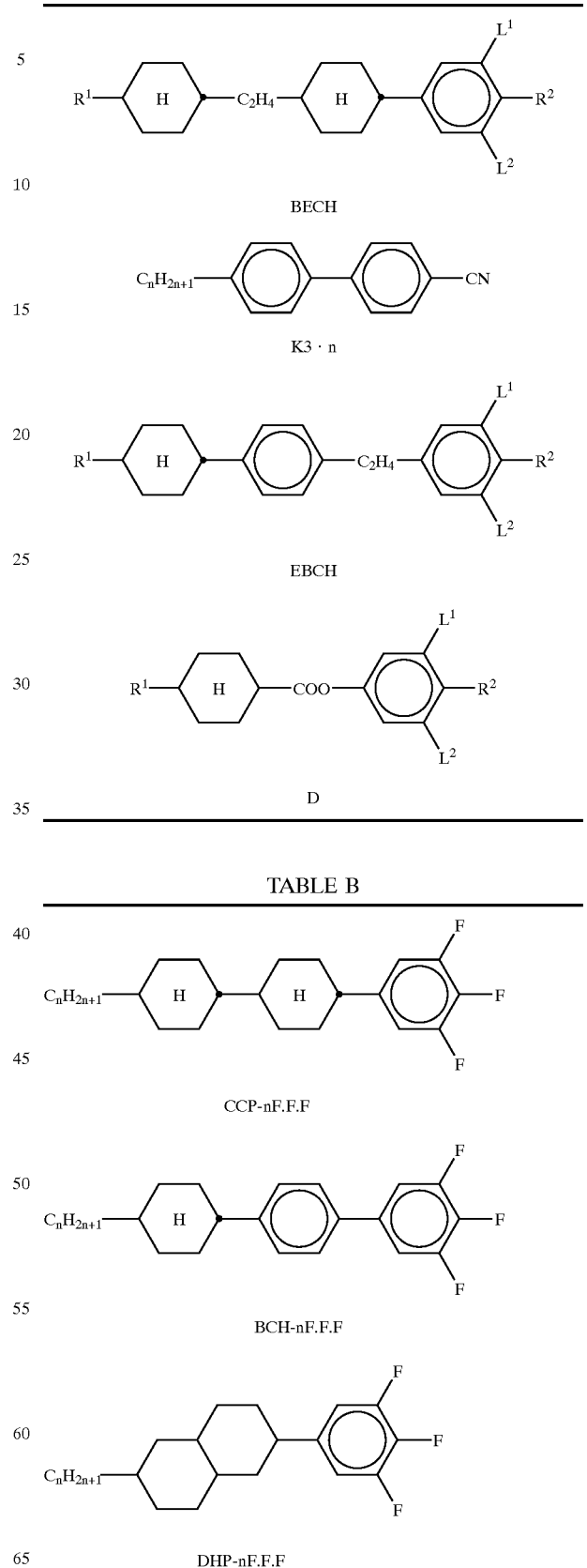

TABLE B-continued
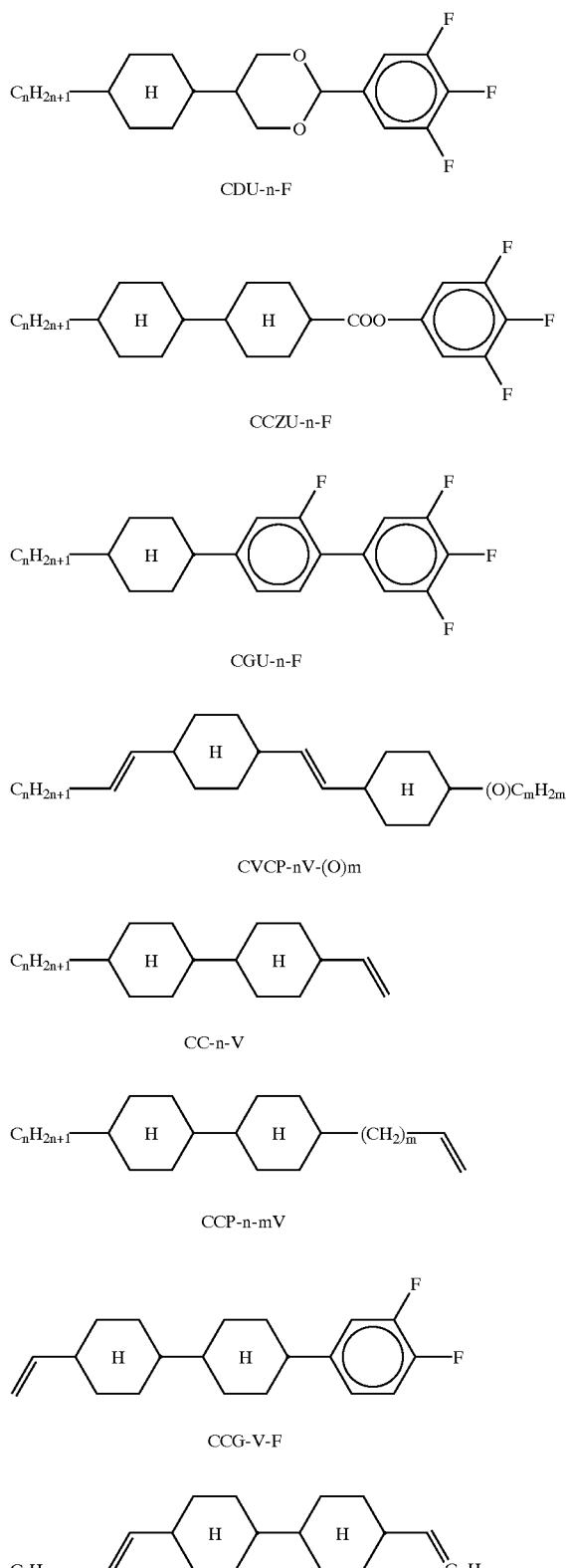
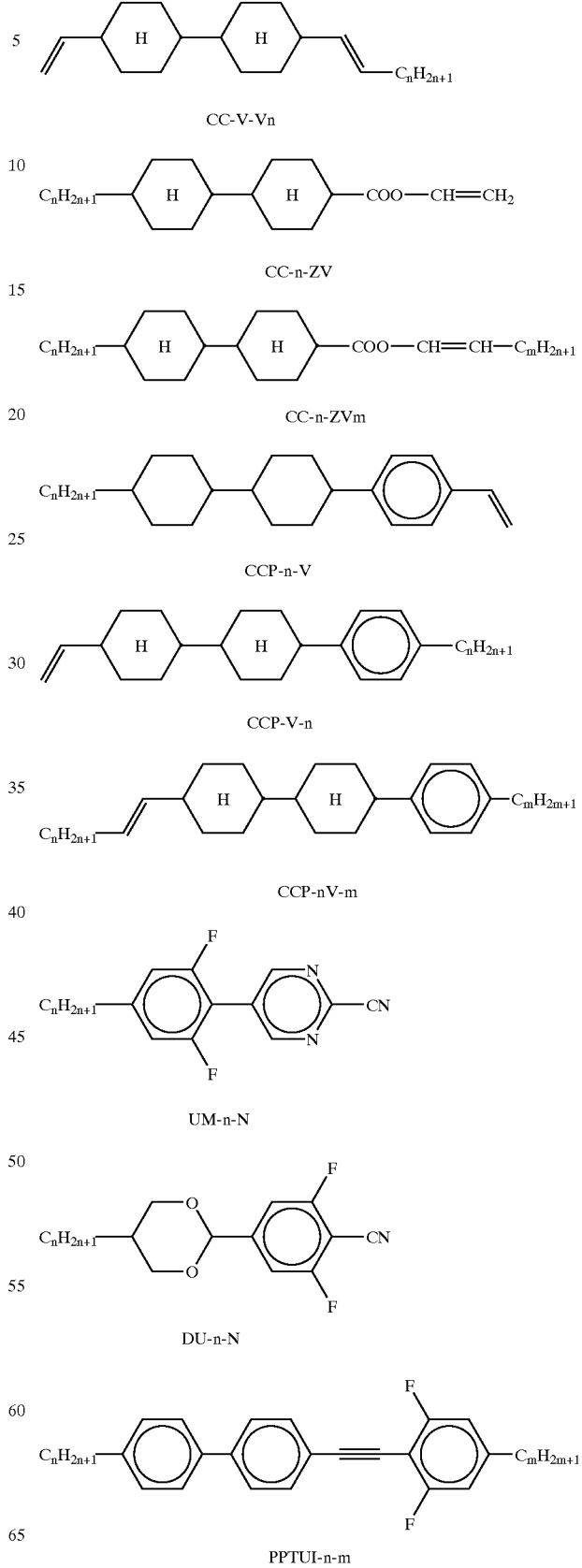

TABLE B-continued

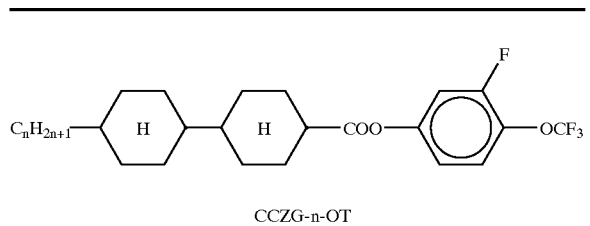

CCZG-n-OT

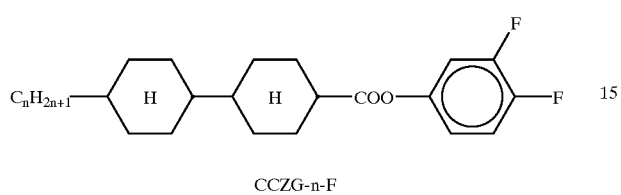

CCZG-n-F

Example 1

An IPS display contains a nematic mixture having

| | |
|---|---|
| clearing point | 81.0° C. |
| Δn [589 nm, 20° C.] | 0.0778 |
| $n_o$ [589 nm, 20° C.] | 1.4686 |
| Δε [1 kHz, 20° C.] | 13.0 |
| $\epsilon_\perp$ [1 kHz, 20° C.] | 5.4 |
| $V_o$ [1 kHz, 20° C.] | 0.88 V |
| rotational viscosity (20° C.) | 128 mPa · s |

| consisting of Compound | c/% by weight |
|---|---|
| CCP-2F.F.F | 3.0 |
| PCH-3N.F.F | 15.0 |
| CCZU-2-F | 7.0 |
| CCZU-3-F | 15.0 |
| CCZU-5-F | 7.0 |
| CCZG-2-OT | 10.0 |
| CCZG-3-OT | 10.0 |
| CCZG-5-OT | 10.0 |
| CC-3-V1 | 11.0 |
| CC-5-V | 9.0 |
| MEN.F | 3.0 |
| Σ | 100.0 | and has adequate contrast.
The capacitive threshold $V_0$ (1 kHz; 20° C.) is 0.88 V.

Example 2

An IPS display contains a nematic mixture having

| | |
|---|---|
| clearing point | 80.5° C. |
| Δn [589 nm, 20° C.] | 0.0773 |
| $n_o$ [589 nm, 20° C.] | 1.4684 |
| Δε [1 kHz, 20° C.] | 13.5 |
| $\gamma_1$ [20° C.] | 127 mPa · s |
| $\epsilon_\perp$ [1 kHz, 20° C.] | 5.5 |
| $V_o$ [1 kHz, 20° C.] | 0.84 V |

| consisting of Compound | c/% by weight |
|---|---|
| CCP-2F.F.F | 3.0 |
| PCH-3N.F.F | 15.0 |
| CCZU-2-F | 7.0 |
| CCZU-3-F | 15.0 |
| CCZU-5-F | 7.0 |
| CCZG-2-OT | 10.0 |
| CCZG-3-OT | 10.0 |
| CCZG-5-OT | 10.0 |
| CC-3-V1 | 11.0 |
| CC-5-V | 9.0 |
| UM-3-N | 3.0 |
| Σ | 100.0 |

Example 3

An IPS display contains a nematic mixture having

| | |
|---|---|
| clearing point | 76.4° C. |
| Δn [589 nm, 20° C.] | 0.0787 |
| $n_o$ [589 nm, 20° C.] | 1.4626 |
| Δε [1 kHz, 20° C.] | 14.1 |
| $\epsilon_\perp$ [1 kHz, 20° C.] | 6.4 |
| $\gamma_1$ [20° C.] | 135 mPa · s |
| $V_o$ [1 kHz, 20° C.] | 0.80 V |

| consisting of Compound | c/% by weight |
|---|---|
| CCP-2OCF$_3$ | 3.0 |
| DU-3-N | 15.0 |
| CCZU-2-F | 7.0 |
| CCZU-3-F | 15.0 |
| CCZU-5-F | 7.0 |
| CCZG-2-OT | 10.0 |
| CCZG-3-OT | 10.0 |
| CCZG-5-OT | 10.0 |
| CC-3-V1 | 11.0 |
| CC-5-V | 9.0 |
| MEN.F | 3.0 |
| Σ | 100.0 |

Example 4

An IPS display contains a nematic mixture having

| | |
|---|---|
| clearing point | 73.5° C. |
| Δn [589 nm, 20° C.] | 0.0725 |
| $n_o$ [589 nm, 20° C.] | 1.4675 |
| Δε [1 kHz, 20° C.] | 14.3 |
| $\epsilon_\perp$ [1 kHz, 20° C.] | 6.5 |
| $\gamma_1$ [20° C.] | 131 mPa · s |
| $V_o$ [1 kHz, 20° C.] | 0.77 V |

| consisting of Compound | c/% by weight |
|---|---|
| CCP-2F.F.F | 3.0 |
| DU-3-N | 15.0 |
| CCZU-2-F | 7.0 |
| CCZU-3-F | 15.0 |
| CCZU-5-F | 7.0 |
| CCZG-2-OT | 10.0 |
| CCZG-3-OT | 10.0 |
| OCZG-5-OT | 10.0 |
| CC-3-V1 | 11.0 |
| CC-S-V | 9.0 |
| UM-3-N | 3.0 |
| Σ | 100.0 |

Example 5

An IPS display contains a nematic mixture having

| | |
|---|---|
| clearing point | 76.0° C. |
| Δn [589 nm, 20° C.] | 0.0630 |
| $n_o$ [589 nm, 20° C.] | 1.4682 |

| consisting of Compound | c/% by weight |
|---|---|
| CCH-301 | 22.0 |
| CC-5-V | 16.0 |
| CCP-20CF3 | 6.0 |
| CCP-40CF3 | 5.0 |
| CCP-2F.F.F | 7.0 |
| CCP-3F.F.F | 7.0 |
| CCZU-2-F | 7.0 |
| CCZU-3-F | 13.0 |
| CCZG-2-OT | 6.0 |
| CCZG-3-OT | 11.0 |
| Σ | 100.0 |

Example 6

An IPS display contains a nematic mixture having

| | |
|---|---|
| clearing point | 71.0° C. |
| Δn [589 nm, 20° C.] | 0.0904 |
| $n_o$ [589 nm, 20° C.] | 1.4778 |
| Δε [1 kHz, 20° C.] | 12.0 |
| $ε_⊥$ [1 kHz, 20° C.] | 5.0 |
| $γ_1$ [20° C.] | 153 mPa · s |

| consisting of Compound | c/% by weight |
|---|---|
| CC-5-V | 8.0 |
| CCZU-2-F | 6.0 |
| CCZU-3-F | 15.0 |
| CCZU-5-F | 6.0 |
| CGU-2-F | 11.0 |
| CGU-3-F | 11.0 |
| CGU-5-F | 7.0 |
| BCH-3F.F.F | 10.0 |
| CCP-2F.F.F | 8.0 |
| CCZG-2-OT | 10.0 |
| CCZG-3-OT | 8.0 |
| Σ | 100.0 |

Example 7

An IPS display contains a nematic mixture having

| | |
|---|---|
| clearing point | 80.0° C. |
| Δn [589 nm, 20° C.] | 0.0636 |
| $n_o$ [589 nm, 20° C.] | 1.4672 |

| consisting of Compound | c/% by weight |
|---|---|
| CCH-301 | 10.0 |
| CCH-501 | 10.0 |
| CCH-5CF3 | 10.0 |
| CCP-2F.F.F | 11.0 |
| CCP-3F.F.F | 9.0 |
| CCP-5F.F.F | 5.0 |
| CCZU-2-F | 5.0 |
| CCZU-3-F | 10.0 |
| CCZU-4-F | 7.0 |
| CCZU-5-F | 5.0 |
| CCZG-2-OT | 6.0 |
| CGZG-3-OT | 9.0 |
| CCPC-34 | 3.0 |
| Σ | 100.0 |

Example 8

An IPS display contains a nematic mixture having

| Compound | c/% by weight |
|---|---|
| CCP-2F.F.F | 10.0 |
| CCP-3F.F.F | 10.0 |
| CCP-5F.F.F | 8.0 |
| ME2N.F | 2.0 |
| PDX-4 | 7.0 |
| PCH-3N.F.F | 10.0 |
| CCZG-2-OT | 10.5 |
| CCZG-3-OT | 7.0 |
| CCZU-2-F | 7.0 |
| CCZU-3-F | 15.0 |
| CCZU-5-F | 7.0 |
| CCH-34 | 5.0 |
| CCPC-34 | 1.5 |
| Σ | 100.0 |

Example 9

An IPS display contains a nematic mixture having

| | |
|---|---|
| clearing point | 70.0° C. |
| Δε [1 kHz, 20° C.] | 10.4 |
| $ε_⊥$ [1 kHz, 20° C.] | 4.5 |

| consisting of Compound | c/% by weight |
|---|---|
| CCZG-2-OT | 16.0 |
| CCZG-3-OT | 14.0 |
| BCH-3F.F.F | 12.0 |
| BCH-5F.F.F | 10.0 |
| CGU-2-F | 9.0 |
| CCP-30CF3 | 7.0 |
| CCP-2F.F.F | 12.0 |
| CCP-3F.F.F | 12.0 |
| PCH-7F | 8.0 |
| Σ | 100.0 |

Example 10

An IPS display contains a nematic mixture having

| | |
|---|---|
| clearing point | 81.0° C. |
| Δn [589 nm, 20° C.] | 0.0778 |
| $n_o$ [589 nm, 20° C.] | 1.4686 |
| Δε [1 kHz, 20° C.] | 13.0 |
| $ε_⊥$ [1 kHz, 20° C.] | 5.4 |
| $γ_1$ [20° C.] | 128 mPa · s |
| $V_0$ [1 kHz, 20° C.] | 0.88 V |

-continued

| consisting of Compound | c/% by weight |
|---|---|
| CCP-2F.F.F | 3.0 |
| PCH-3N.F.F | 15.0 |
| CCZU-2-F | 7.0 |
| CCZU-3-F | 15.0 |
| CCZU-5-F | 7.0 |
| CCZG-2-OT | 10.0 |
| CCZG-3-OT | 10.0 |
| CCZG-5OT | 10.0 |
| CC-3-V1 | 1.0 |
| CC-5-V | 9.0 |
| ME2N.F | 3.0 |
| Σ | 100.0 |

Comparative Example

An IPS display contains a nematic mixture having

| clearing point | 72° C. |
|---|---|
| Δn [589 nm, 20° C.] | 0.0751 |
| $n_o$ [589 nm, 20° C.] | 1.4730 |
| Δε [1 kHz, 20° C.] | 10.2 |
| $\epsilon_\perp$ [1 kHz, 20° C.] | 4.7 |
| $\gamma_1$ [20° C.] | 124 mPa · s |
| $V_o$ [1 kHz, 20° C.] | 1.01 V |

| consisting of Compound | c/% by weight |
|---|---|
| CCP-2F.F.F | 6.0 |
| CCP-3F.F.F | 9.0 |
| CCP-5F.F.F | 2.0 |
| CCP-2OCF$_3$ | 8.0 |
| CCP-3OCF$_3$ | 6.0 |
| CCP-4OCF$_3$ | 4.0 |
| CCP-5OCF$_3$ | 7.0 |
| PDX-3 | 2.0 |
| PDX-4 | 8.0 |
| PDX-5 | 8.0 |
| CCZU-2-F | 3.0 |
| CCZU-3-F | 16.0 |
| CCZU-5-F | 3.0 |
| CCH-301 | 6.0 |
| CCH-303 | 6.0 |
| CCH-501 | 6.0 |
| Σ | 100.0 |

What is claimed is:

1. An electro-optical liquid-crystal display having a realignment layer for realigning the liquid crystals whose field has a component, which is crucial for the realignment, parallel to the liquid-crystal layer, containing a liquid-crystalline medium of positive dielectric anisotropy, which medium comprises one or more compounds of the formula I

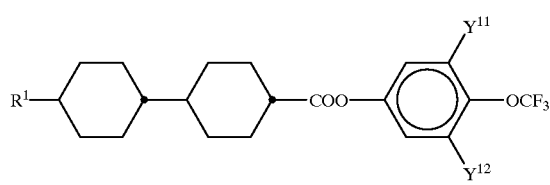

I in which $R^1$ is alkyl or alkoxy having 1 to 7 carbon atoms or alkenyl, alkenyloxy or alkoxyalkyl having 2 to 7 carbon atoms, $Y^{11}$ is F, and $Y^{12}$ is H or F.

2. An electro-optical liquid-crystal display having a realignment layer for realigning the liquid crystals whose field has a component, which is crucial for the realignment, parallel to the liquid-crystal layer, containing a liquid-crystalline medium of positive dielectric anisotropy, which medium comprises one or more compounds of the formula I

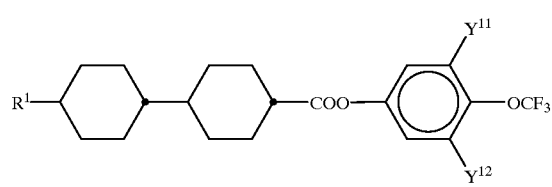

I in which $R^1$ is alkyl or alkoxy having 1 to 7 carbon atoms or alkenyl, alkenyloxy or alkoxyalkyl having 2 to 7 carbon atoms, $Y^{11}$ is F, and $Y^{12}$ is H or F; and the medium further comprises at least one compound of the formula II:

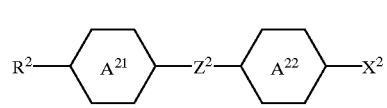

II in which $R^2$ is alkyl or alkoxy having 1 to 7 carbon atoms or alkenyl, alkenyloxy or alkoxyalkyl having 2 to 7 carbon atoms, $A^{21}$ and $A^{22}$ are each, independently of one another,

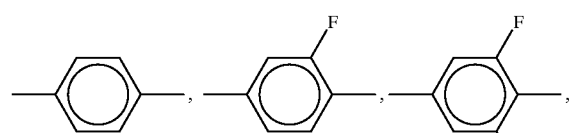

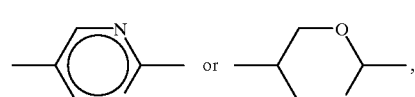

provided that at least one of $A^{21}$ and $A^{22}$ is

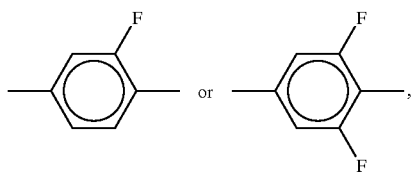

$X^2$ is F, Cl or CN, and
$Z^2$ is $CH_2CH_2$, COO, $CF_2O$ or a single bond.

3. An electro-optical liquid-crystal display having a realignment layer for realigning the liquid crystals whose field has a component, which is crucial for the realignment, parallel to the liquid-crystal layer, containing a liquid-crystalline medium of positive dielectric anisotropy,
which medium comprises one or more compounds of the formula I

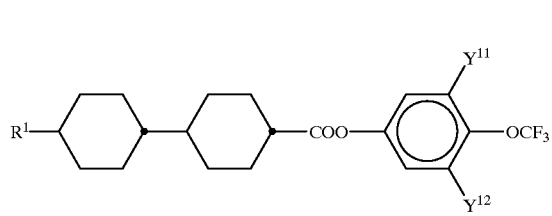

in which
$R^1$ is alkyl or alkoxy having 1 to 7 carbon atoms or alkenyl, alkenyloxy or alkoxyalkyl having 2 to 7 carbon atoms,
$Y^{11}$ is F, and
$Y^{12}$ is H or F; and
the medium further comprises at least one compound of the formula III

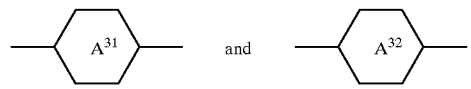

in which
$R^{31}$ and $R^{32}$ are each, independently of one another, alkyl or alkoxy having 1 to 7 carbon atoms or alkenyl, alkenyloxy or alkoxyalkyl having 2 to 7 carbon atoms,

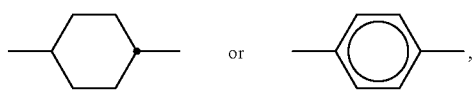

are each, independently of one another,

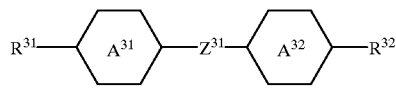

and
$Z^{31}$ is CH=CH, COO, $CH_2CH_2$ or a single bond.

4. A liquid-crystal display according to claim 2, wherein the medium further comprises at least one compound of the formula III

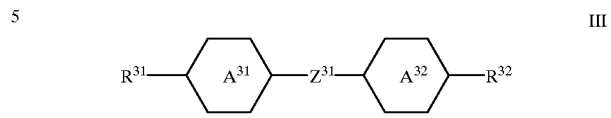

in which
$R^{31}$ and $R^{32}$ are each, independently of one another, alkyl or alkoxy having 1 to7 carbon atoms or alkenyl, alkenyloxy or alkoxyalkyl having 2 to 7 carbon atoms,

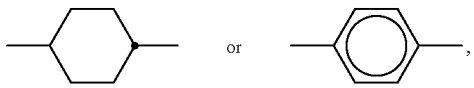

are each, independently of one another,

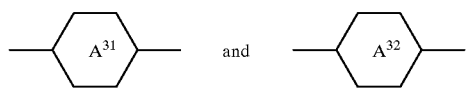

and
$Z^{31}$ is CH=CH, COO, $CH_2CH_2$ or a single bond.

5. A liquid-crystal display according to claim 1, wherein the medium further comprises at least one compound of the formula IV

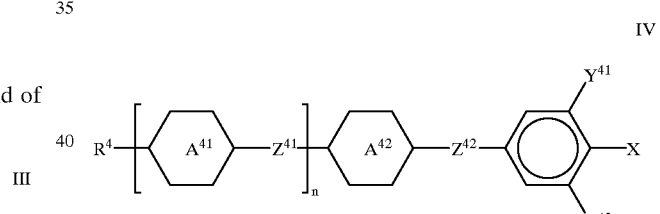

in which
$R^4$ is alkyl or alkoxy having 1 to 7 carbon atoms or alkenyl, alkenyloxy or alkoxyalkyl having 2 to 7 carbon atoms,

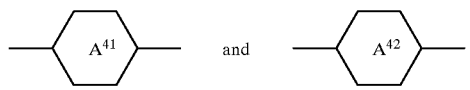

are each, independently of one another,

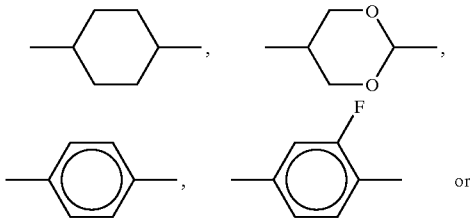

-continued

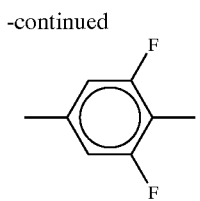

$Z^{41}$ and $Z^{42}$ are each, independently of one another, $CF_2O$, $COO$, $CH_2CH_2$ or a single bond, n is 0 or 1, X is $OCF_3$, $OCF_2H$ or F, and $Y^{41}$ and $Y^{42}$ are each, independently of one another, H or F.

6. A liquid-crystal display according to claim 2, wherein the medium further comprises at least one compound of the formula IV

IV

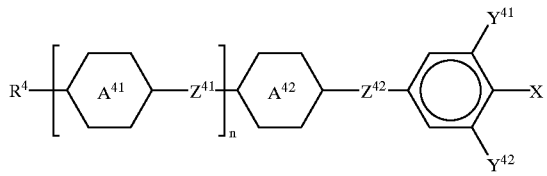

in which $R^4$ is alkyl or alkoxy having 1 to 7 carbon atoms or alkenyl, alkenyloxy or alkoxyalkyl having 2 to 7 carbon atoms,

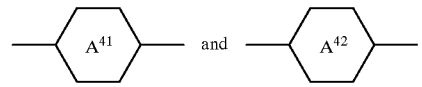

are each, independently of one another,

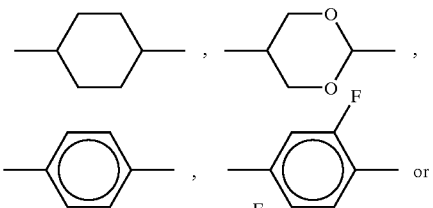

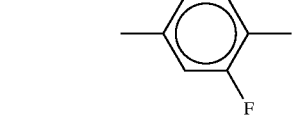

$Z^{41}$ and $Z^{42}$ are each, independently of one another, $CF_2O$, $COO$, $CH_2CH_2$ or a single bond, n is 0 or 1, X is $OCF_3$, $OCF_2H$ or F, and $Y^{41}$ and $Y^{42}$ are each, independently of one another, H or F.

7. A liquid-crystal display according to claim 3, wherein the medium further comprises at least one compound of the formula IV

IV

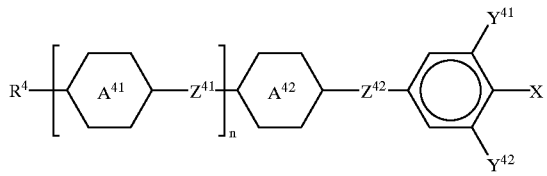

in which $R^4$ is alkyl or alkoxy having 1 to 7 carbon atoms or alkenyl, alkenyloxy or alkoxyalkyl having 2 to 7 carbon atoms,

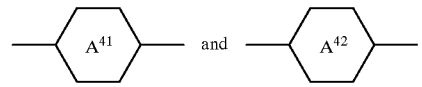

are each, independently of one another,

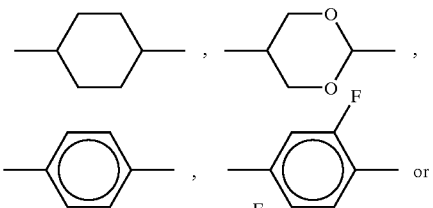

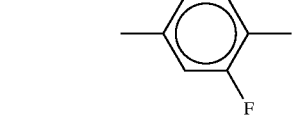

$Z^{41}$ and $Z^{42}$ are each, independently of one another, $CF_2O$, $COO$, $CH_2CH_2$ or a single bond, n is 0 or 1, X is $OCF_3$, $OCF_2H$ or F, and $Y^{41}$ and $Y^{42}$ are each, independently of one another, H or F.

8. A liquid-crystal display according to claim 4, wherein the medium further comprises at least one compound of the formula IV

IV

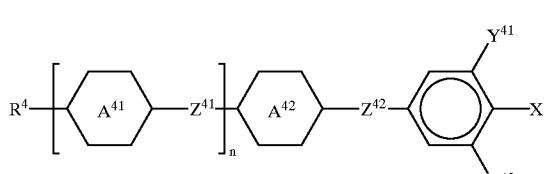

in which $R^4$ is alkyl or alkoxy having 1 to 7 carbon atoms or alkenyl, alkenyloxy or alkoxyalkyl having 2 to 7 carbon atoms,

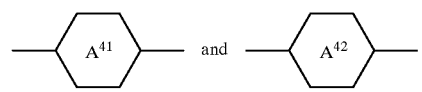

are each, independently of one another,

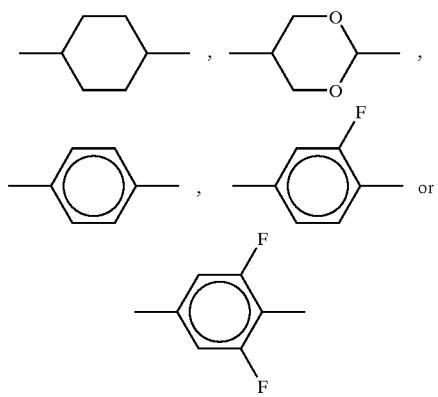

$Z^{41}$ and $Z^{42}$ are each, independently of one another, $CF_2O$, $COO$, $CH_2CH_2$ or a single bond, n is 0 or 1, X is $OCF_3$, $OCF_2H$ or F, and $Y^{41}$ and $Y^{42}$ are each, independently of one another, H or F.

9. A liquid-crystal display according to claim 2, wherein the medium comprises one or more compounds of the formula II selected from the group consisting of compounds of one of the formulae IIa to IIi:

IIa
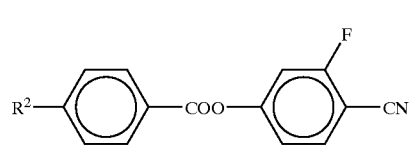

IIb
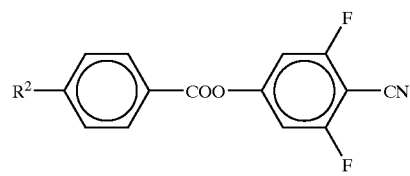

IIc
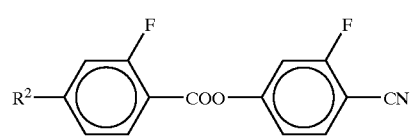

IId
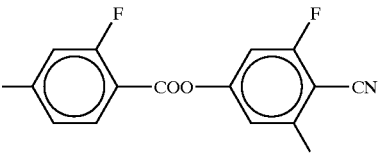

IIe
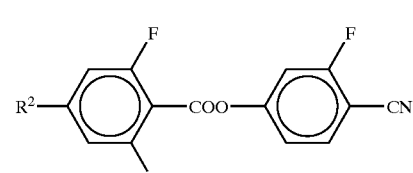

IIf
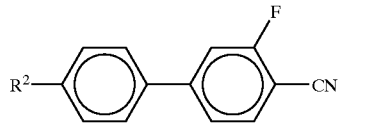

IIg
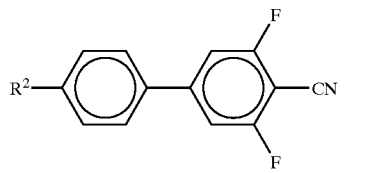

IIh
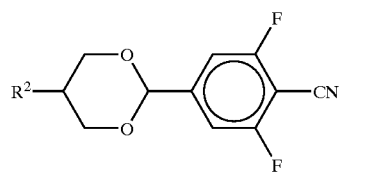

IIi
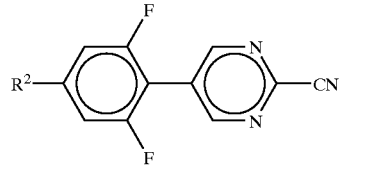

in which $R^2$ is as defined above in the formula II.

10. A liquid-crystal display according to claim 3, wherein the medium comprises one or more compounds of the formula III selected from the group consisting of compounds of one of the formulae IIIa to IIIc:

IIIa
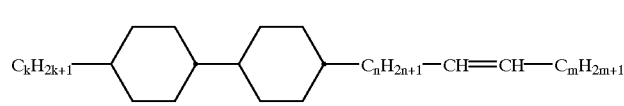

IIIb
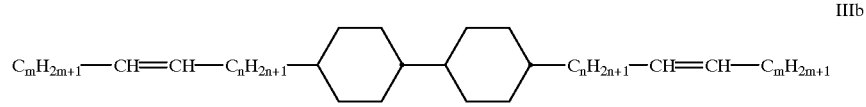

-continued

IIIc

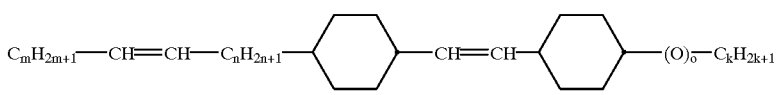

in which k 1, 2, 3, 4 or 5, m and n are each, independently of one another, 0, 1, 2 or 3, and m+n≦5, and o is 0 or 1.

11. A liquid-crystal display according to claim 8, wherein the medium comprises from 4 to 55% by weight of at least one compound of the formula I, from 5 to 50% by weight of one or more compounds selected from the group consisting of the compounds of the formulae II and III, from 0 to 40% by weight of at least one compound of the formula II, from 0 to 30% by weight of at least one compound of the formula Ill, and from 5 to 60% by weight of at least one compound of the formula IV.

12. A liquid-crystal display according to claim 1, having pixels addressed by means of an active matrix.

13. A liquid-crystalline medium comprising one or more compounds of the formula I

I

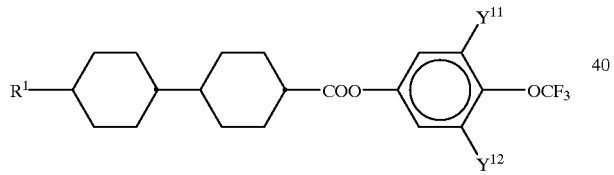

in which

R$^1$ is alkyl or alkoxy having 1 to 7 carbon atoms or alkenyl, alkenyloxy or alkoxyalkyl having 2 to 7 carbon atoms, Y$^{11}$ is F, and Y$^{12}$ is H or F, and further comprising at least one compound of the formula II:

II

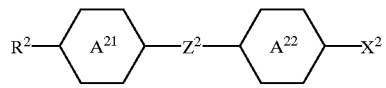

in which

R$^2$ is alkyl or alkoxy having 1 to 7 carbon atoms or alkenyl, alkenyloxy or alkoxyalkyl having 2 to 7 carbon atoms, A$^{21}$ and A$^{22}$ are each, independently of one another,

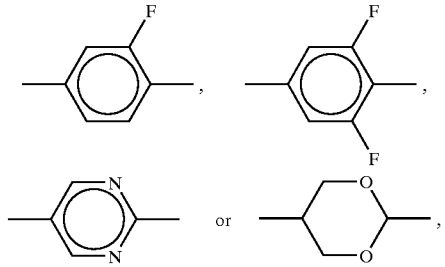

at least one of A$^{21}$ and A$^{22}$ is

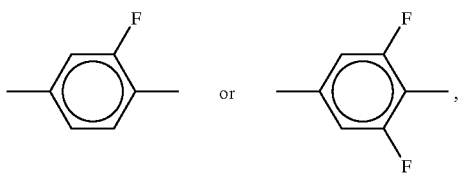

X$^2$ is F, Cl or CN, and

Z$^2$ is CH$_2$CH$_1$, COO, CF$_2$O or a single bond.

14. A liquid-crystalline medium of claim 13, further comprising at least one compound of the formula III

III

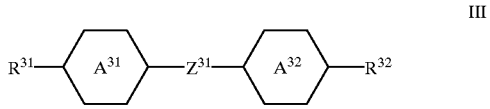

in which

R$^{31}$ and R$^{32}$ are each, independently of one another, alkyl or alkoxy having 1 to 7 carbon atoms or alkenyl, alkenyloxy or alkoxyalkyl having 2 to 7 carbon atoms,

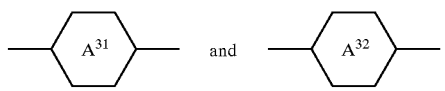

are each, independently of one another,

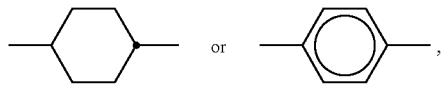

and

Z$^{31}$ is CH=CH, COO, CH$_2$CH$_2$ or a single bond.

15. A liquid-crystalline medium of claim 13, wherein the medium further comprises at least one compound of the formula IV

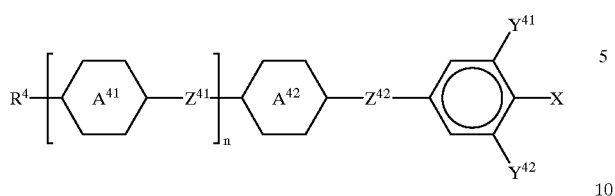

in which
R$^4$ is alkyl or alkoxy having 1 to 7 carbon atoms or alkenyl, alkenyloxy or alkoxyalkyl having 2 to 7 carbon atoms,

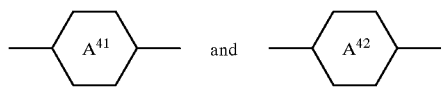

are each, independently of one another,

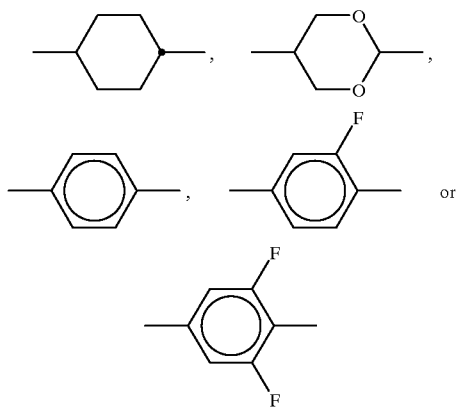

Z$^{41}$ and Z$^{42}$ are each, independently of one another, CF$_2$O, COO, CH$_2$CH$_2$ or a single bond,
n is 0 or 1,
X is OCF$_3$, OCF$_2$H or F, and
Y$^{41}$ and Y$^{42}$ are each, independently of one another, H or F.

16. A liquid-crystal display comprising a liquid-crystalline medium of claim 13.

17. A liquid-crystal display comprising a liquid-crystalline medium of claim 14.

18. A liquid-crystal display comprising a liquid-crystalline medium of claim 15.

19. A medium of claim 13, wherein the medium comprises at least one compound of the formula II wherein:
A$^{21}$ is

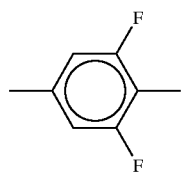

and A$^{22}$ is

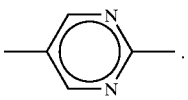

20. A medium of claim 13, wherein the medium comprises at least one compound of the formula II wherein:
A$^{21}$ is

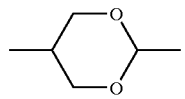

and A$^{22}$ is

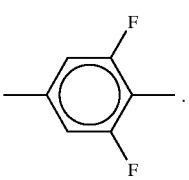

21. A medium of claim 13, wherein the medium comprises at least one compound of the formula II wherein the A$^{21}$ and A$^{22}$ rings are selected from 3-fluorophenylene and 3,5-difluorophenylene rings.

22. A liquid-crystal display comprising a liquid-crystalline medium of claim 19.

23. A liquid-crystal display comprising a liquid-crystalline medium of claim 20.

24. A liquid-crystal display comprising a liquid-crystalline medium of claim 21.

* * * * *